United States Patent [19]
Grimes et al.

[11] 3,885,760
[45] May 27, 1975

[54] AUTOPILOT RADIO GUIDANCE SIGNAL CIRCUIT INCLUDING CONTROLLED INTEGRATOR

[75] Inventors: Alton O. Grimes, Fort Lauderdale; Frank D. Pugh, Pompano Beach, both of Fla.

[73] Assignee: The Bendix Corporation, Southfield, Mich.

[22] Filed: Mar. 8, 1974

[21] Appl. No.: 449,318

[52] U.S. Cl...... 244/77 B; 235/150.22; 235/150.27; 244/77 A; 343/107; 235/183; 307/229; 328/127
[51] Int. Cl. ............................................ B64c 13/20
[58] Field of Search ...................... 73/178 R, 178 T; 235/150.22, 150.26, 150.27, 183, 197; 244/77 A, 77 B, 77 E; 307/228, 229; 318/583; 328/127; 340/27 R, 27 NA; 343/107

[56] References Cited
UNITED STATES PATENTS

| | | | |
|---|---|---|---|
| 3,136,502 | 6/1964 | Auld, Jr. et al. | 244/77 A |
| 3,445,846 | 5/1969 | Diani | 244/77B X |
| 3,549,874 | 12/1970 | Vachitis | 235/183 X |
| 3,813,532 | 5/1974 | Sato et al. | 328/127 X |

Primary Examiner—Trygve M. Blix
Assistant Examiner—Stephen G. Kunin
Attorney, Agent, or Firm—Bruce L. Lamb; W. G. Christoforo

[57] ABSTRACT

An autopilot command signal circuit for radio guidance in which the command signal comprises the sum of the radio guidance signal and the output of a threshold controlled integrator to which said guidance signal is applied. When the radio signal level corresponds to large error, no integration is provided. Between certain error values, integration is provided. On reaching the lower of the error values, the integrator is discharged, whereafter it again operates to compensate for cross wind. Different integrator gains and thresholds are provided for autopilot Navigation and Approach modes of operation.

5 Claims, 1 Drawing Figure

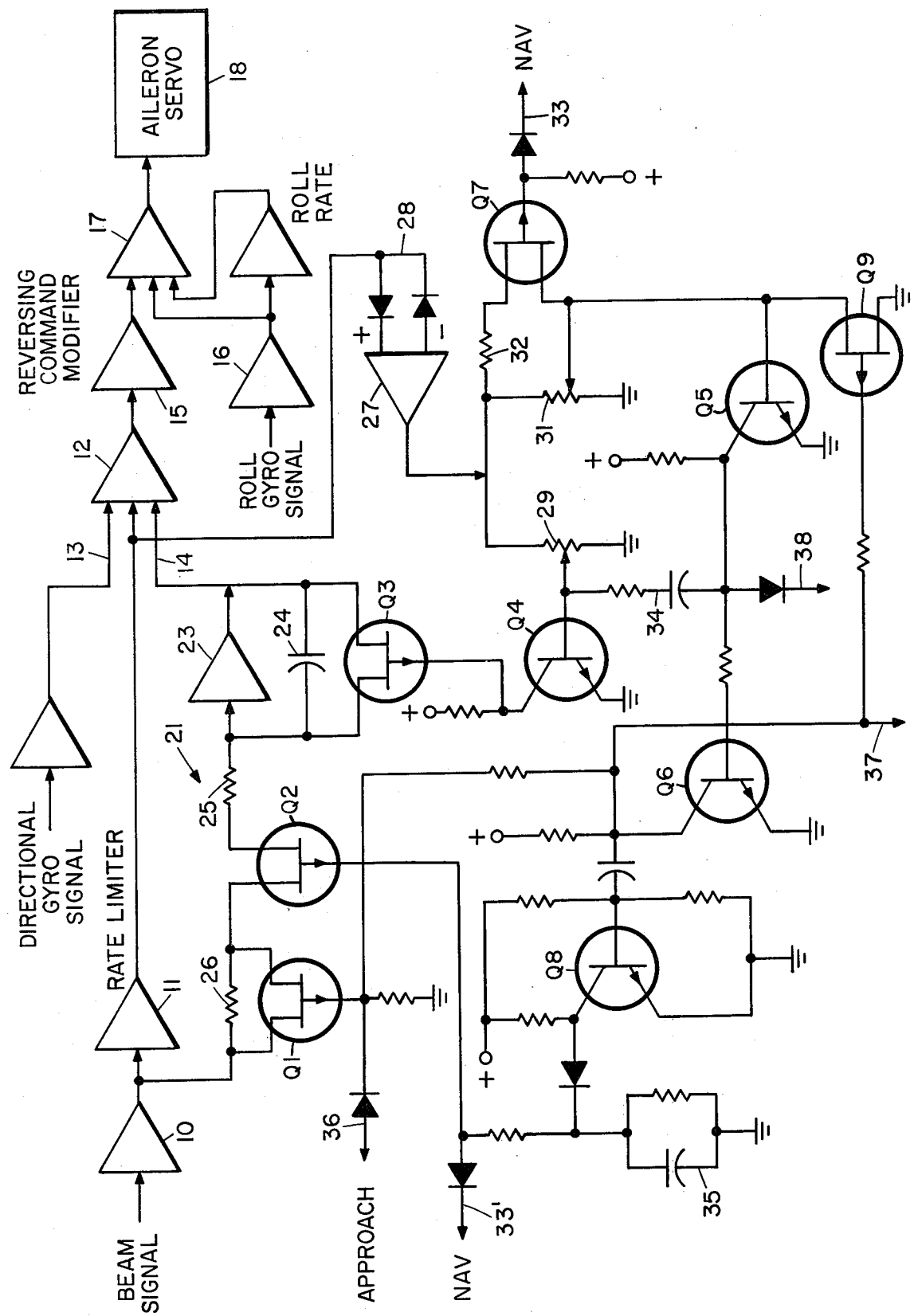

AUTOPILOT RADIO GUIDANCE SIGNAL CIRCUIT INCLUDING CONTROLLED INTEGRATOR

The present invention relates generally to aircraft autopilots and more particularly to an improved autopilot control circuit operative during radio beam guidance which incorporates a variable gain integrator for modifying the radio beam signals applied to the autopilot.

U.S. Pat. No. 3,144,221 describes an autopilot which responds to combined signals from a directional gyro and a radio beam to steer an aircraft along a selected course or glide path. It is there explained that under conditions of cross wind or wind shear the aircraft heading necessarily differs from a selected radio course with the result that the gyro will indicate a course error when the aircraft is actually on the desired radio course. To prevent the gyro from introducing error the output therefrom is passed through a long time-constant differentiating circuit before being applied to the autopilot servo thereby blocking gyro outputs of steady duration, as caused by a sustained cross wind, but allowing short duration gyro outputs, as caused by gusts, to pass to the servo and provide effective damping therefor. During the "capture" or "heading" modes of autopilot operation, the differentiating circuit is short circuited by a manually controlled relay so that the gyro output, including the long duration or steady component thereof, can properly be used as the command signal to the autopilot servo.

According to the present invention the performance of an autopilot of the type described in U.S. Pat. No. 3,144,221 is improved by eliminating the gyro signal differentiating network thereof and providing in its place an integrating circuit which operates on the beam signal.

It is an object of the present invention to provide an autopilot which in radio guidance mode automatically "captures" or intercepts a desired radio beam more rapidly than prior known types and which thereafter tracks the selected beam with greater accuracy than heretofore attained.

It is another object of the invention to provide in an autopilot operating with radio guidance an integrating circuit for radio guidance signals which possesses different gains which are changed upon changing the mode of operation of the autopilot so that the same integrator may be used during enroute navigation and during approach where the beam sensitivities differ substantially.

It is a further object of the invention to provide a command signal circuit for an autopilot for radio beam guidance in which error signal accumulated by a beam signal integrator is automatically discharged when the aircraft nears the desired course and which thereafter operates normally to compensate for cross wind or wind shear.

Briefly, the invention comprises, in an autopilot, means combining a gyro signal, a radio signal, either from a VOR receiver or an ILS receiver, depending upon whether the autopilot is operating in the NAV or APPROACH mode, and a signal which is proportional to the time integral of the radio signal to provide a composite command signal for the autopilot servo. The time integral of the radio signal is provided by an operational amplifier connected with an integrating capacitor in the feedback together with a first switching transistor controlled by threshold means sensitive to the level of the radio signal. In the NAV (VOR) mode the threshold means hold the first transistor conductive and the integrator inoperative as long as the radio signal is greater than a level corresponding to about 6° off course, between signal levels corresponding to about 6° and 1½° off course the transistor is off and the integrator is operative. Upon reaching a signal level corresponding to about 1½° off course, the transistor is momentarily switched on, causing the integrator to discharge and thereafter operate normally. Second and third switching transistors appear in the input of the amplifier, the second altering the input resistance and hence gain of the integrator in the APPROACH mode and the third being controlled by the threshold means to momentarily open the integrator input during APPROACH mode when the signal level decreases to about ⅓°.

The single FIGURE of the drawing is a functional block diagram, partially in schematic form showing the portion of the autopilot command signal circuit embodying the invention.

Referring to the drawing, an amplifier 10 receives the beam signal from either a VOR or an ILS receiver, depending upon whether the NAV or APPROACH mode of operation is selected for the autopilot. Either of these modes is selected manually by the pilot, depending upon whether he is flying enroute or approaching an airport for landing. Beam signal from amplifier 10 is passed through a rate limiter 11, which limits the amplitude of perturbations or transients therein, to one input of a summing amplifier 12. Amplifier 12 also receives on line 13 an input from the directional gyro and an input on line 14 from the integrating circuit of this invention.

The output of amplifier 12 is applied to a reversing command modifier circuit 15 such as is described in pending U.S. patent application Ser. No. 351,897, filed Apr. 17, 1973 by A. O. Grimes, now U.S. Pat. No. 3,814,352. Signal from the reversing command modifier is combined with a stabilizing signal from a roll gyro amplifier 16 and with roll rate derived from output of amplifier 16 in a summing amplifier 17, the output of which constitutes the command signal to the autopilot aileron servo 18.

Whenever the aircraft is on the selected radio beam course and it is not subject to disturbance from cross wind, mistrim or other cause, signal from amplifier 10 is ideally zero and aileron servo 18 maintains a wings-level flight attitude. When capturing a beam, signal from amplifier 10 will be of a magnitude and sense determined by the displacement off the radio beam. This signal will pass to the servo 18 causing the aircraft to roll in the proper direction to change heading onto the beam. As the aircraft moves towards the selected course the magnitude of signal from amplifier 10 diminishes so that the selected course is actually an asymptote to the flight path. The signal on lead 14 is the time integral of the signal from amplifier 10 so that even though signal from amplifier 10 diminishes as the selected course is neared, signal on lead 14 remains at a substantial level thereby causing the aircraft to capture the selected course more "tightly." When the selected beam is attained, or nearly attained, signal on lead 14 must be eliminated since once on course that signal would command the aircraft to move off course.

The time integral signal on lead 14 is provided by an integrating circuit 21 which is controlled by FET transistors, $Q_1$, $Q_2$ and $Q_3$ and by the circuits depending therefrom in such manner that when the beam error signal from amplifier 10 is large no integration is provided. As the error signal drops to a level below which the approach of the aircraft to course would be regarded as "loose," integrator 21 becomes operative and "tightens" the heading onto course. When the selected course is neared, integrator 21 is discharged to dispose of the previously accumulated error. Thereafter operation of the integrator is restored to compensate for cross wind or other disturbances.

Integrator 21 is comprised by an operational amplifier 23 with a feedback capacitor 24 and input resistors 25, 26. Transistor $Q_3$ is connected to short circuit capacitor 24 when rendered conductive and thus reduce and hold the output of amplifier 23 to zero. Transistor $Q_2$, when conductive, permits signal to flow from amplifier 10 through resistors 26 and 25 to the input of amplifier 23. When non-conductive, transistor $Q_2$ prevents signal flow into amplifier 23. Transistor $Q_1$, when conductive, short circuits input resistor 26 and thereby increases the gain of integrator 21 in accordance with the well known principle that the gain of an operational amplifier is proportional to the ratio of the feedback impedance to the input impedance.

An amplifier 27 having inverting and non-inverting inputs receives input from rate limiter 11 through oppositely poled diodes 28. The polarity of output from amplifier 27 is therefore positive regardless of the polarity of the input thereto and of a magnitude proportional to the output of rate limiter 11. A first threshold setting potentiometer 29 is connected to the output of amplifier 27 and is adjusted to provide a voltage at the arm thereof which will drive transistor $Q_4$ into saturation whenever the beam signal equals or exceeds a level corresponding to $100/^{ua}$ in a standard course deviation indicator. For VOR navigation full scale deflection of the course deviation indicator is attained at $150/^{ua}$, corresponding to 10° deviation. Transistor $Q_4$ is therefore saturated and transistor $Q_3$ is thereby rendered conductive whenever the course error exceeds about 6° in the NAV mode.

A second threshold setting potentiometer 31 is connected to the output of amplifier 27. Voltage at the arm of potentiometer 31 controls conduction of transistor $Q_5$ and for the purpose of setting the threshold of transistor $Q_5$, transistor $Q_7$ is arranged to connect a shunting resistor 32 between the high end and the arm of potentiometer 31. In the NAV mode, switching means (not shown) applies ground to line 33, thereby rendering transistor $Q_7$ conductive and effectively increasing the voltage setting at the arm of potentiometer 31. With $Q_7$ non-conductive, the arm of potentiometer 31 is adjusted to cause saturation of transistor $Q_5$ whenever the beam signal equals or exceeds a level corresponding to $30/^{ua}$. With $Q_7$ conductive, resistor 32 is of proper value compared with the resistance of potentiometer 31 to require the voltage at the arm of potentiometer 31 to correspond to $20/^{ua}$ of beam signal or greater to cause saturation of transistor $Q_5$.

A differentiating network 34 joins the collector of transistor $Q_5$ with the base of transistor $Q_4$. A timing circuit including transistors $Q_6$ and $Q_8$ and a charging network 35 connects the collector of transistor $Q_5$ with the gate of transistor $Q_2$. The gate of transistor $Q_2$ is also connected through an isolating diode to line 33' of the autopilot mode switching means. The gate of transistor $Q_1$ is connected through an isolating diode to line 36 of the autopilot mode switching means.

Integrating circuit 21 and its associated threshold control functions during NAV and APPROACH autopilot modes as follows. In NAV, lines 33 and 33' are grounded and line 36 carries a positive voltage rendering transistors $Q_2$ and $Q_7$ conductive and $Q_1$ nonconductive. If the aircraft is about 6° or greater off course the beam signal will be at a level corresponding to greater than $100/^{ua}$ causing saturation of transistor $Q_4$ and conduction of transistor $Q_3$. The output of integrator 21 is then zero because of the short circuit across capacitor 24 and will remain so until the aircraft draws to within about 6° off course. The beam signal will then drop to a level below that corresponding to $100/^{ua}$ and $Q_4$ and $Q_3$ become non-conductive permitting integrator 21 to operate. As the beam center is neared, the beam signal drops to a level corresponding to $20/^{ua}$. Prior to this time transistor $Q_5$ has been saturated. At the beam signal level corresponding to $20/^{ua}$ $Q_5$ becomes non-conductive, causing a positive pulse conducted through network 34 to momentarily cause conduction of transistors $Q_4$ and $Q_3$ thereby discharging the error signal accumulated in integrator 21. Below the level corresponding to $20/^{ua}$ $Q_5$ remains non-conductive, as do transistors $Q_4$ and $Q_3$, permitting integrator 21 to accumulate a new output value for compensating for cross wind and the like. The timing circuit including transistors $Q_6$ and $Q_8$ cannot cause transistor $Q_2$ to become non-conductive during NAV because of the ground placed on line 33'.

When the beam error decreases to values rendering $Q_5$ non-conductive, the system is considered to be in the track mode. When $Q_5$ becomes non-conductive, $Q_6$ conducts removing bias from the gate of transistor $Q_9$ permitting it to conduct and clamp the base of $Q_5$ to ground. With $Q_5$ thus immobilized beam error signals no longer affect operation of the integrator via $Q_5$ and $Q_6$. Line 37 provides control to change aircraft bank limiter settings and the like which are lowered during track because of the smaller maneuvers than required. Diode 38 connected to the autopilot mode switching means unlatches the track mode switch $Q_9$ whenever the autopilot mode is changed or a new course is selected.

In the APPROACH mode, ground is removed from lines 33 and 33' and applied to line 36, thereby removing the fixed gate bias applied to $Q_1$ during NAV. Transistors $Q_4$ and $Q_3$ operate as in the NAV mode to maintain the output of integrator 21 at zero so long as the beam signal exceeds a level corresponding to $100/^{ua}$. Between that level and a level corresponding to $30/^{ua}$ transistor $Q_5$ is saturated. Transistor $Q_7$ is non-conductive increasing the voltage from amplifier 27 on potentiometer 31 necessary to maintain $Q_5$ saturated. When the beam signal drops below a level corresponding to $30/^{ua}$, $Q_5$ is cut-off, momentarily rendering transistors $Q_4$ and $Q_3$ conductive and discharging integrator 21. With $Q_5$ off, previously non-conducting transistor $Q_6$ becomes conductive removing bias to $Q_1$ rendering it conductive and also applying a negative pulse to the base of normally conducting transistor $Q_8$. $Q_9$ becomes conductive, thereby latching the circuit in the track mode. The voltage at the collector of transistor $Q_8$ rises nearly to the value of the supply voltage to charge network 35 rapidly and cause transistor $Q_2$ to become non-conductive for approximately 45 seconds, the time required for network 35 to discharge. In APPROACH, therefore, integrator 21 operates at normal gain at beam signal levels corresponding to between $100/^{ua}$ and at $30/^{ua}$ and at $30/^{ua}$ the integrator is discharged and held inoperative for 45 seconds whereafter it operates at increased gain to compensate for wind shear and similar disturbance.

The invention claimed is:

1. A radio command signal circuit for an aircraft autopilot comprising:
    means supplying a radio guidance signal the amplitude and polarity of which is related to the displacement of the aircraft off the desired radio course;
    integrating means providing an output proportional to the time integral of said radio guidance signal, said integrating means having control means for rendering said output zero;
    means supplying said radio guidance signal and said output of said integrating means to the autopilot to cause said autopilot to steer the aircraft in a direction to reduce the amplitude of said radio guidance signal;
    threshold means for actuating said integrating means control, said threshold means being operative at signal levels of said radio guidance signal equalling or exceeding a first upper level to hold output from said integrating means at zero and being operative at a second lower level for momentarily rendering output from said integrating means zero; and
    means for setting said second lower level of said threshold means at one value when the source of said radio guidance signals is VOR and at a second value when the source of said radio guidance signals is ILS.

2. A command signal circuit as claimed in claim 1, with additionally, means controlled by said threshold means for changing the proportionality of output to input of said integrating means when the source of said radio guidance signals is ILS and when the signal level of radio guidance signal equals or is below said second value of said second lower level.

3. A radio command signal circuit for an aircraft autopilot, comprising:
    an integrator including an amplifier, an input impedance and a capacitor connected in inverse feedback relationship;
    a first switching transistor connected to short circuit said capacitor when conductive;
    a second switching transistor for interrupting input to said amplifier when non-conductive;
    a third switching transistor connected to alter the value of said input impedance when conductive;
    threshold means responsive to the signal level of radio guidance signals, said signal level varying as the displacement off course of the aircraft guided by said signal, said threshold means causing conduction of said first transistor when said signal level equals or exceeds a first value corresponding to a relatively large error in the aircraft course, said threshold means causing momentary conduction of said first transistor whenever said signal level diminishes to a second value corresponding to a relatively small error in the aircraft course;
    means normally rendering said second transistor conductive and said third transistor non-conductive;
    means applying the radio guidance signal to said input impedance of said integrator; and,
    means combining output of said integrator amplifier with the radio guidance signal to provide command signal to the autopilot.

4. A command signal circuit as claimed in claim 3, with additionally, means for selecting a different value of said second value of signal level at which said threshold means responds according to whether the source of radio guidance signal is VOR or ILS.

5. A command signal circuit as claimed in claim 4 wherein said threshold means responding to said second value of signal level for radio guidance signals from ILS renders said third transistor continuously conductive and said second transistor non-conductive for a limited time.

* * * * *